J. A. STEINMETZ.
ATTACHMENT FOR AIRCRAFT USED IN WAR.
APPLICATION FILED OCT. 29, 1917.

1,364,152. Patented Jan. 4, 1921.

Witness
Edwin L. Bradford

Inventor
Joseph A. Steinmetz
By Greene & Greene
Attorneys.

UNITED STATES PATENT OFFICE.

JOSEPH A. STEINMETZ, OF PHILADELPHIA, PENNSYLVANIA.

ATTACHMENT FOR AIRCRAFT USED IN WAR.

1,364,152.     Specification of Letters Patent.     Patented Jan. 4, 1921.

Application filed October 29, 1917. Serial No. 199,096.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Attachments for Aircraft Used in War, of which the following is a specification, reference being had therein to the accompanying drawing.

A leading object of this invention is to aid aircraft attacked by machines of much greater speed capacity. It has until recently been very difficult for slow moving "bombing" machines to cope with swift scout and fighting aeroplanes which have been able to follow, in line, the slower craft and destroy it by gunfire, while themselves comparatively safe since the slower machine could not shoot directly rearward. Of late, rear firing heavy machines have been developed. Even these machines are at a great disadvantage since the faster machine can rise, fall, turn, change speed, etc., more rapidly, and so keep out of the line of the slower machine's fire while itself delivering shot after shot with probable injurious effect.

I provide a machine with means for, at will, discharging great volumes of gas either opaque or such as to have disabling effect upon those whom it reaches, making normal activity impossible or difficult. If the gas simply forms an opaque cloud it may screen the discharging craft from its pursuer and increase its chances of escape, or if the gas be invisible it may suddenly affect the pursuing aviator, delaying him or preventing his avoiding gun-fire of the pursued craft.

In the accompanying diagrammatic drawings.

Figure 1:
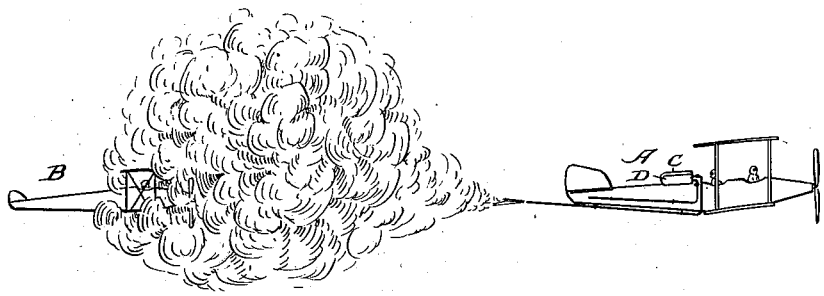
Figure 1 shows a heavy gas discharging, "bombing" machine followed by a smaller hostile craft.
Figure 2:
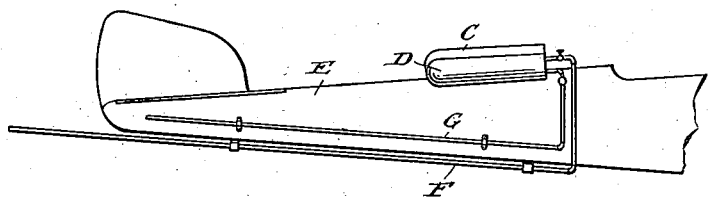
Fig. 2 is a side elevation illustrating a possible arrangement of gas discharging devices.

In these views, A and B represent a pursued and a pursuing machine, respectively, the type of either being immaterial.

The pursued machine is provided with means for discharging a great volume of gas or gases. The means may involve the use of gas generating devices of any well known type and it is shown as including tanks C, D, of any desired number, in this instance mounted on the exterior of the body E of the machine and discharging through pipes F, G, rearwardly near the lower side of the body and each controlled by a valve within reach of the aviator or one of the aviators. The tanks are adapted to deliver gas under pressure, the gas being generated in the tank or compressed in advance of filling of the tank, as may be preferred, both methods being common. If the pipes extend rearward to or beyond the tail vanes, they must of course be so located as not to interfere with the operation of the latter. The tanks may contain like gas or different gases, even as many kinds of gas as there are tanks, one being adapted to form an opaque cloud, one affecting the eyes, one affecting respiration, etc.

What I claim is:

In combination in an aeroplane, a fuselage provided with a seat, a plurality of tanks mounted on top of said fuselage to the rear of said seat within the eddy currents from said seat, conduits from different tanks extending forward of said tanks and thence downwardly and thence back along the bottom of said fuselage to its rearmost end, and manually operated valves in said forwardly extending parts of said conduits, a compressed deleterious gas in one of said tanks and a compressed opaque gas, in another of said tanks.

In testimony whereof I hereunto affix my signature.

JOSEPH A. STEINMETZ.